United States Patent [19]

Grimes

[11] Patent Number: 5,021,943
[45] Date of Patent: Jun. 4, 1991

[54] COTENT INDEPENDENT RULE BASED OPTIONS NEGOTIATIONS METHOD

[75] Inventor: Thomas Grimes, Chandler, Ariz.

[73] Assignee: Motorola, Inc., Schaumburg, Ill.

[21] Appl. No.: 226,488

[22] Filed: Aug. 1, 1988

[51] Int. Cl.⁵ .............................................. G06F 7/04
[52] U.S. Cl. .................... 364/200; 364/284; 364/284.4; 364/259.2; 364/259
[58] Field of Search ... 364/200 MS File, 900 MS File

[56] References Cited

U.S. PATENT DOCUMENTS

| | | | |
|---|---|---|---|
| 4,363,093 | 12/1982 | Davis et al. | 364/200 |
| 4,466,060 | 8/1984 | Riddle | 364/200 |
| 4,648,061 | 3/1987 | Foster | 364/900 |
| 4,766,534 | 8/1988 | DeBenedictis | 364/200 |
| 4,802,162 | 1/1989 | Kakuda et al. | 364/900 |

Primary Examiner—Gareth D. Shaw
Assistant Examiner—Kevin A. Kriess
Attorney, Agent, or Firm—Frank J. Bogacz

[57] ABSTRACT

A methodology for determining the common attributes of two systems or entities is shown. This methodology includes a content independent options negotiation. Tree structures are defined for each entity or system. These tree structures include relational operators and attributes. The tree defining the relational operations and attributes is installed within each entity. For initiating communications between entities, each entity sends its own tree and receives the other system's tree. Comparison analysis is then performed upon the trees to determine where they intersect or match. Matching attributes may indicate that communications between entities may take place.

19 Claims, 8 Drawing Sheets

COTENT INDEPENDENT RULE BASED OPTIONS NEGOTIATIONS METHOD

BACKGROUND OF THE INVENTION

The present invention pertains to the detection of commonality between various systems and more particularly to, a content independent method of determining commonly shared attributes among these systems.

For systems to communicate among one another, it must determined what attributes these systems have in common. Attributes are parameters which describe the capabilities and operabilities of each system. The process of determining which attributes two or more systems have in common is referred to as options negotiations.

Attributes are generally hierarchical in nature. For example, access control attributes may include such items as the type of system present, the security level of the system (e.g. top secret, secret, confidential or unclassified) certification level and accrediting authorities (e.g. DOD, NSA, etc.). Before determining the security level (second level attribute) of another system with which this system is communicating, the system first determines what system type (first level attribute) the other system is. Then, the security level is determined.

Typically, the interrelationships of the attributes and the rules for determining which attributes are shared are fixed for a particular implementation. This provides inflexible options negotiations hardware or software. Such options negotiations methods are termed content dependent since the method must change, if any of the attributes or their interrelationship is changed.

Accordingly, it is an object of the present invention to provide a method for options negotiations which is independent of the attributes and their interrelationship and to allow changes to the attributes or their interrelationships without changing the options negotiations method itself.

SUMMARY OF THE INVENTION

In accomplishing the object of the present invention, a novel options negotiations method is shown. The method for content independent rule based options negotiations includes a method for attribute definition and distribution. The attribute definition and distribution method first defines at least one attribute for the system in terms of a particular grammar. Next, the attributes are converted into a hierarchical tree structure. A subset of the attributes is selected to represent those attributes related to each particular entity (machine) of the system. The subset of attributes for each particular entity is converted into configuration information. Lastly, the configuration information is transmitted to each particular entity for its use.

The attribute definition and distribution method also includes a method for comparison of attributes. This method is executed by each of the entities within the system.

The method for attribute comparison first transmits the configuration information of a first entity to a second entity of the system. Next, the configuration information of the second entity is received by the first entity. The first entity converts the configuration information of the second entity and its own configuration information to corresponding first and second attribute trees. Lastly, the entity compares the first and second attribute trees to determine whether common attribute exist.

BRIEF DESCRIPTION OF THE DRAWINGS

FIG. 5A to the left of FIG. 5B; FIG. 5C immediately to the right of FIG. 5B; and FIG. 5D immediately below FIG. 5A.

DESCRIPTION OF THE PREFERRED EMBODIMENT

Two or more communication systems must exchange information in order to determine whether each has the capability to "talk" exchange information with the other. These systems may be connected via telephone lines, satellite communications or other communication transmission systems. The information used to determine whether systems may "talk" to one another are called attributes. Attributes are hierarchical in nature. For example, the system type may be the first attribute. The next lower level attribute may consist of the security designation of the system (e.g. top secret, secret, confidential or unclassified). The problem solved by the present invention is to provide a the method for determining which attributes two systems have in common, independent of the attributes themselves.

Attributes are typically stored in a RAM, disk or other memory device in each system. These attributes may input to the system by another computer, an operator or other means. Each system includes a front end comprising the present invention which transmits its attributes to other systems; receives the other system's attributes; and determines whether commonality or intersection of these attributes exists. The attributes and their interrelationship must be defined in terms of a grammar.

Figure 1:
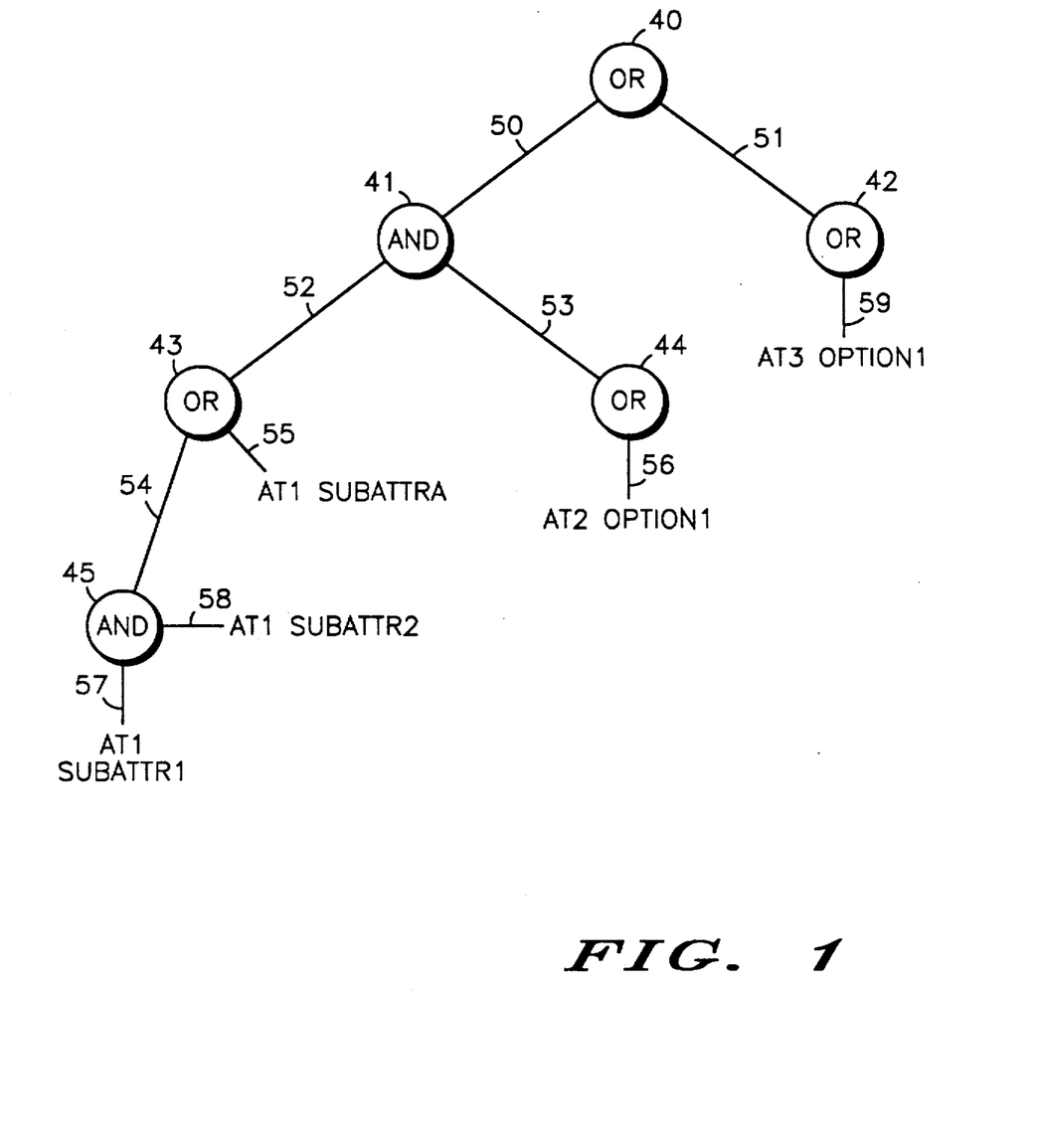
FIG. 1 is a tree diagram representing the access control attributes of a hypothetical system.

FIG. 1 depicts the definition of the attributes in a tree structure. The circles of FIG. 1 are node operators and indicate an operation to be performed. Line segments connecting nodes are called branches. A branch which is not connected to another node operator is called a leaf. The leaves are the attributes.

The tree is hierarchical and starts with node 40 which is an OR operation. The node operators AND and OR are the logical AND and OR operations. Node 40 is connected via branch 50 to node 41 which is an AND operator. Node 40 is also connected via branch 51 to node 42 which is an OR operator. The branches define the hierarchy and the node operators define the relationships of this attribute tree.

Node 41 is connected via branch 52 to OR node 43 and via branch 53 to OR node 44. OR node 43 is connected to AND node 45 via branch 54. AND node 45 is connected to attribute AT1 SUBATTR1 via branch 57 and to attribute AT1 SUBATTR2 via branch 58. OR node 43 is also connected to attribute AT1 SUBATTRA via branch 55. OR node 44 is connected to attribute AT2 OPTION1 via branch 56. OR node 42 is connected to attribute AT3 OPTION1 via branch 59.

Figure 2:
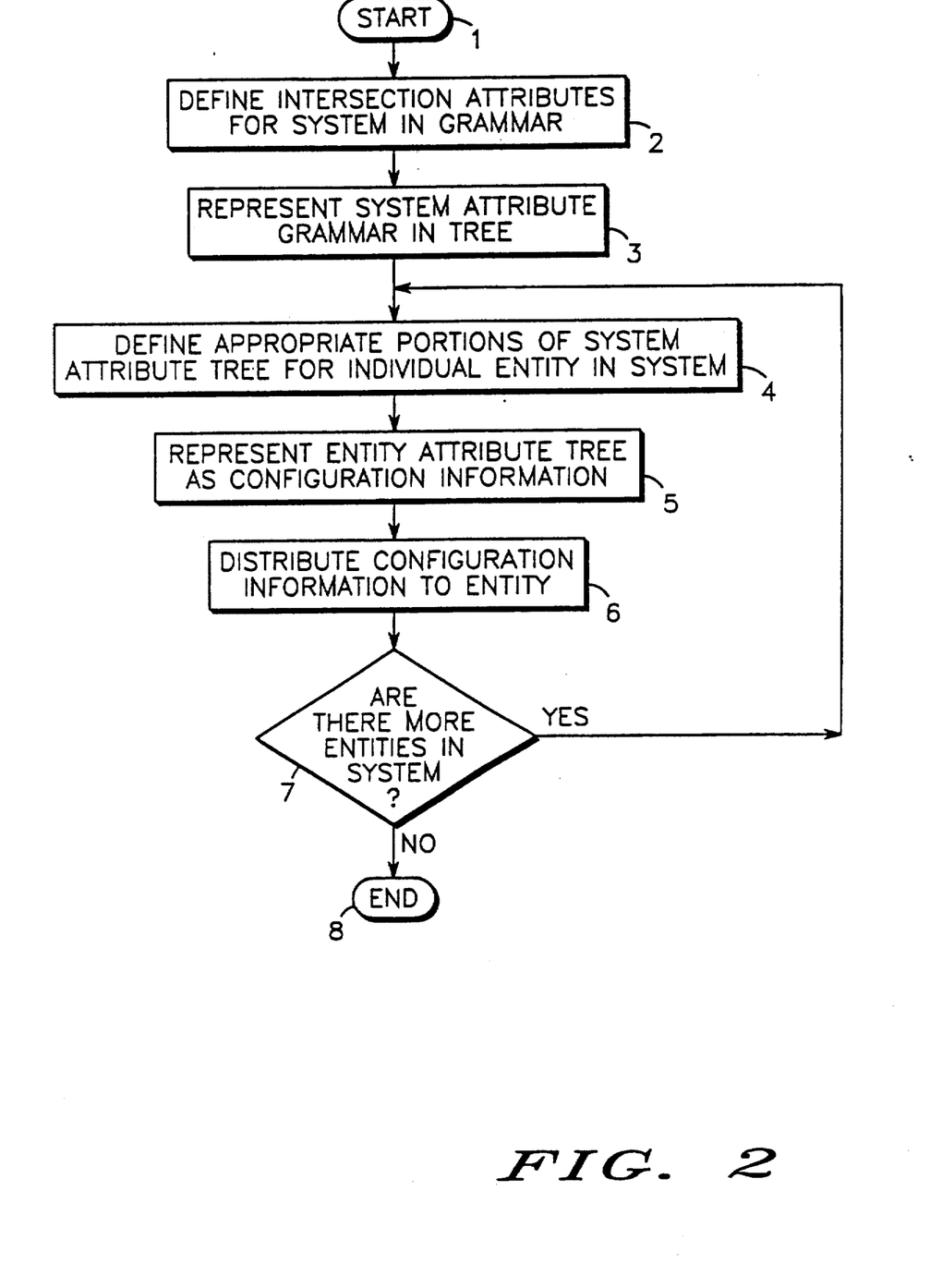
FIG. 2 is a flow chart representing an attribute definition and distribution method.

FIG. 2 depicts the attribute definition and distribution method in flow chart form. The process is started at block 1. Next, control is transferred to block 2 where the intersection attributes for the system's grammar are defined. A grammar set corresponding to the attribute tree of FIG. 1 is shown in Table 1 below.

TABLE 1

ACCESS CONTROL ATTRIBUTE SET GRAMMAR

ACCESS_CONTROL_ATTRIBUTE_SET:= REL_OPTION1|REL_OPTION2
REL_OPTION1:= ATTRIBUTE1 + ATTRIBUTE2
REL_OPTION2:= ATTRIBUTE3
ATTRIBUTE1:= AT1_OPTION1|AT1_OPTION2
ATTRIBUTE2:= AT2_OPTION1
ATTRIBUTE3:= AT3_OPTION1
AT1_OPTION1:= AT1_SUBATTR1 + AT1_SUBATTR2
AT2_OPTION2:= AT2_SUBATTRA where + = AND and | = OR.

Next, the attribute grammar is represented in tree form, block 3. Next, block 4 defines the appropriate of a system's attribute tree particular to each individual entity within the system. That is, each of the entities may not have the same attributes and interrelationships as every other entity. As a result, the tree representation of each of these entities would appear differently. A particular entity's tree structure constitutes a subset of the attributes which exist for the system. Some of the systems may have more attributes than the others or have different nodal structures (interrelationships). Next, the attribute tree for an entity is represented as configuration information, block 5. This is necessary since the configuration information will be loaded into the memory of the processor of each entity. The configuration information is represented in binary form.

Block 6 distributes the configuration information to each of the entities of the system. The distribution of the configuration information may take place electronically by computer transmission via a modem, satellite link, read-only-memories, disk, or manually via an operator. Any method of loading information into the memory of a machine may be employed for this distribution of the configuration information.

Block 7 determines whether each of the entities (machines) of the system have had their configuration information distributed to them. If there are other entities in the system requiring configuration information, the YES path is followed and control is transferred from block 7 to block 4. Blocks 4 through 6 are iterated for each of the entities within the system. As a result, each of the entities will have its own attribute tree structure stored in its memory. When there are no more entities to be configured, block 7 transfers control via the NO path to block 8 and the process will be ended.

Figure 3:
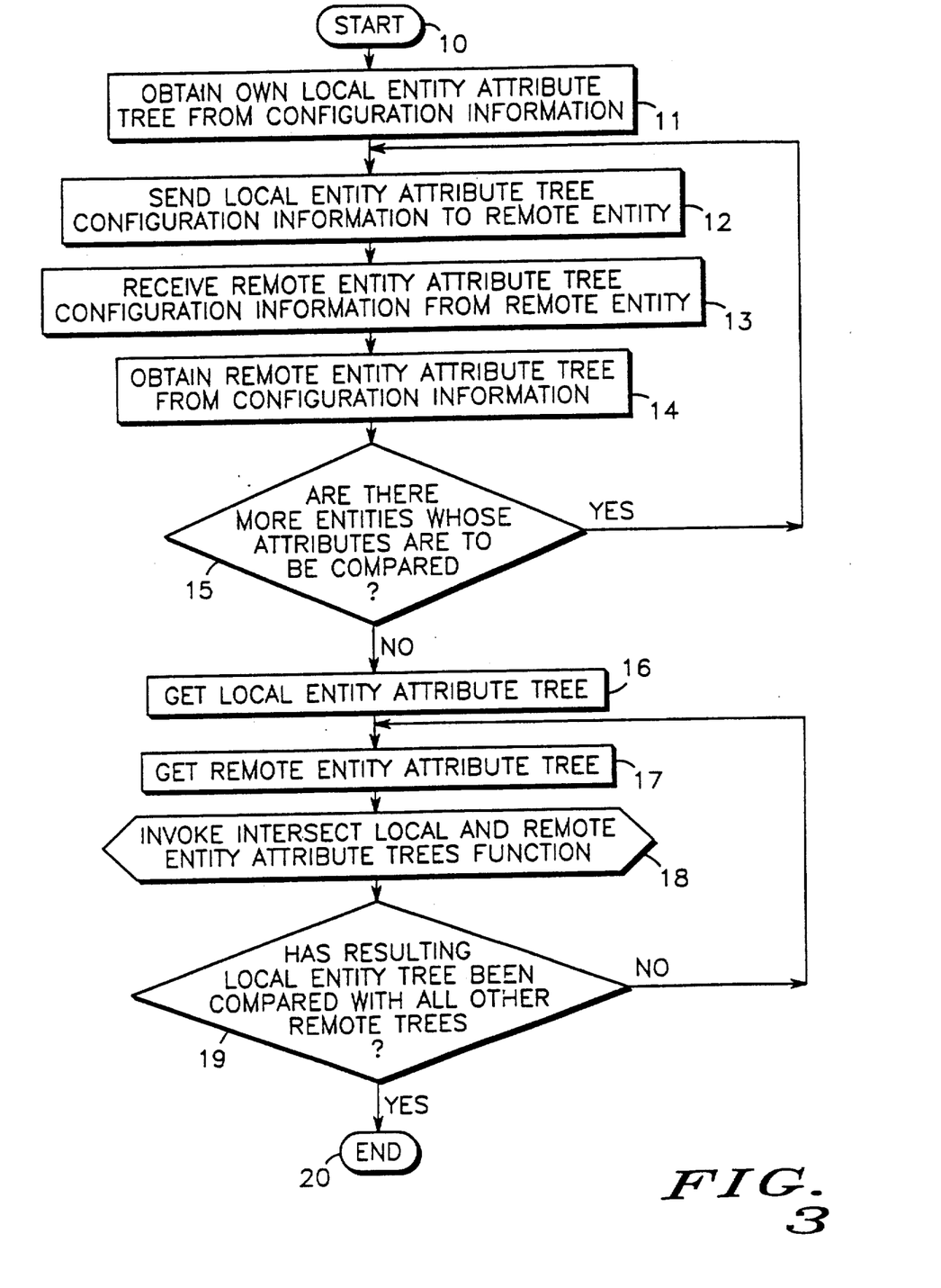
FIG. 3 is a flow chart depicting the controls for the tree comparison process performed by each system or entity.

FIG. 3 depicts the method performed by each entity prior to communication with other entities in the system for determining whether common attributes between the two entities exist. The performance of this method assumes that each of the entities within the system has communication capability with suitable protocol via a communication link. The process is initiated at block 10 which transfers control to block 11. Block 11 obtains the entity's own attribute tree from the previously stored configuration information. Then, the local entity sends its attribute tree information to the other entity for comparison, block 12. Block 13 receives the other entity's attribute tree information. Block 14 constructs the attribute tree of the other entity from the previously transmitted configuration information.

Next, block 15 determines whether there are other entities also desiring communication with this entity. These attributes must be compared. If there are other entities who desire communication (e.g. pair wise, three way, four way, etc.), the Y path is followed from block 15 to block 12. The steps of blocks 12 through 14 are iterated for each of the entities desiring communication.

If there are no other entities desiring communication, the NO path is followed from block 15 to block 16.

The local entity obtains its own attribute tree for comparison, block 16. Next, the first entity's attribute tree is obtained for comparison, block 17. The function or method for intersecting the local and remote entities-'attribute trees is invoked, block 18. This consists of a call to the intersect local and remote entity attribute trees logic of FIG. 4.

Lastly, block 19 determines whether the local entity's attribute tree has been compared with each of the other remote entities'attribute trees. If all the trees have not been compared, block 19 transfers control to block 17 via the NO path. Blocks 17 and 18 are iterated for each of the remaining remote entities. If the attribute trees of all the remaining remote entities have been compared with the attribute tree of the local entity, the YES path is followed from block 19 to block 20 and the process is ended.

Figure 4:
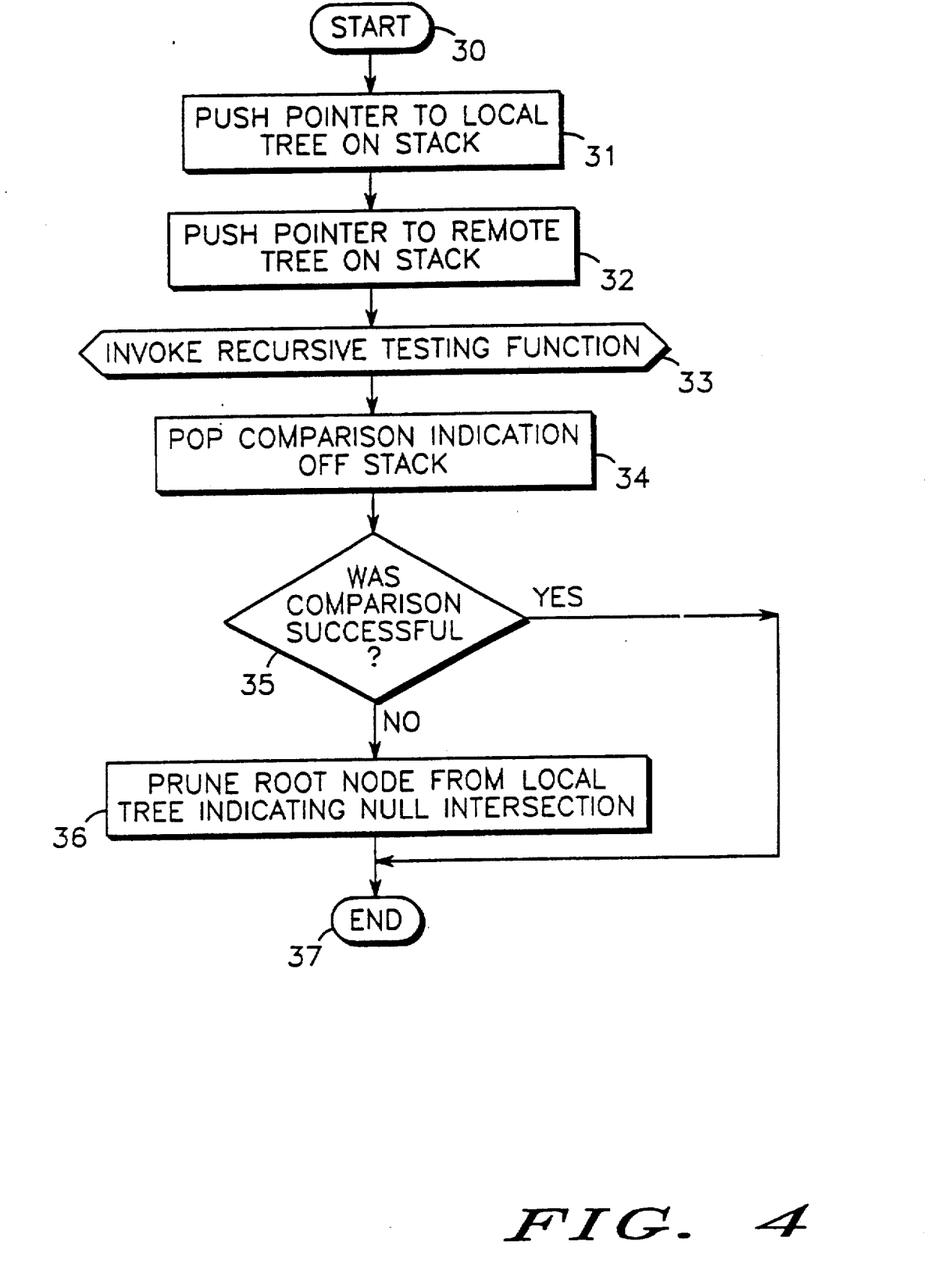
FIG. 4 depicts the control process for attribute tree intersection.
Figure 5A:
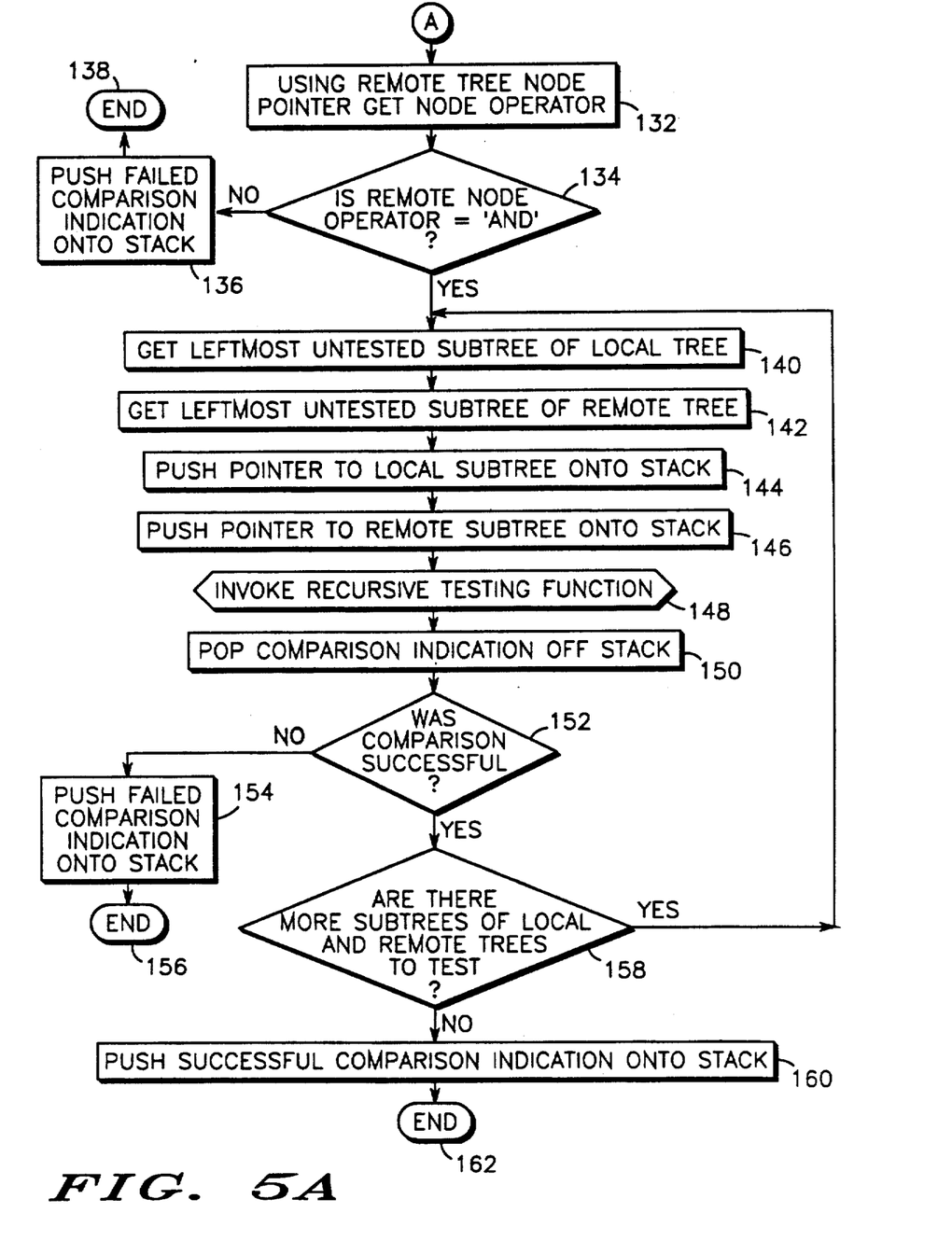
FIGS. 5A, 5B, 5C and 5D comprise a flow chart representing the recursive testing function used for tree comparison. These figures are to be interpreted with FIG. 5B in the middle.
Figure 5B:
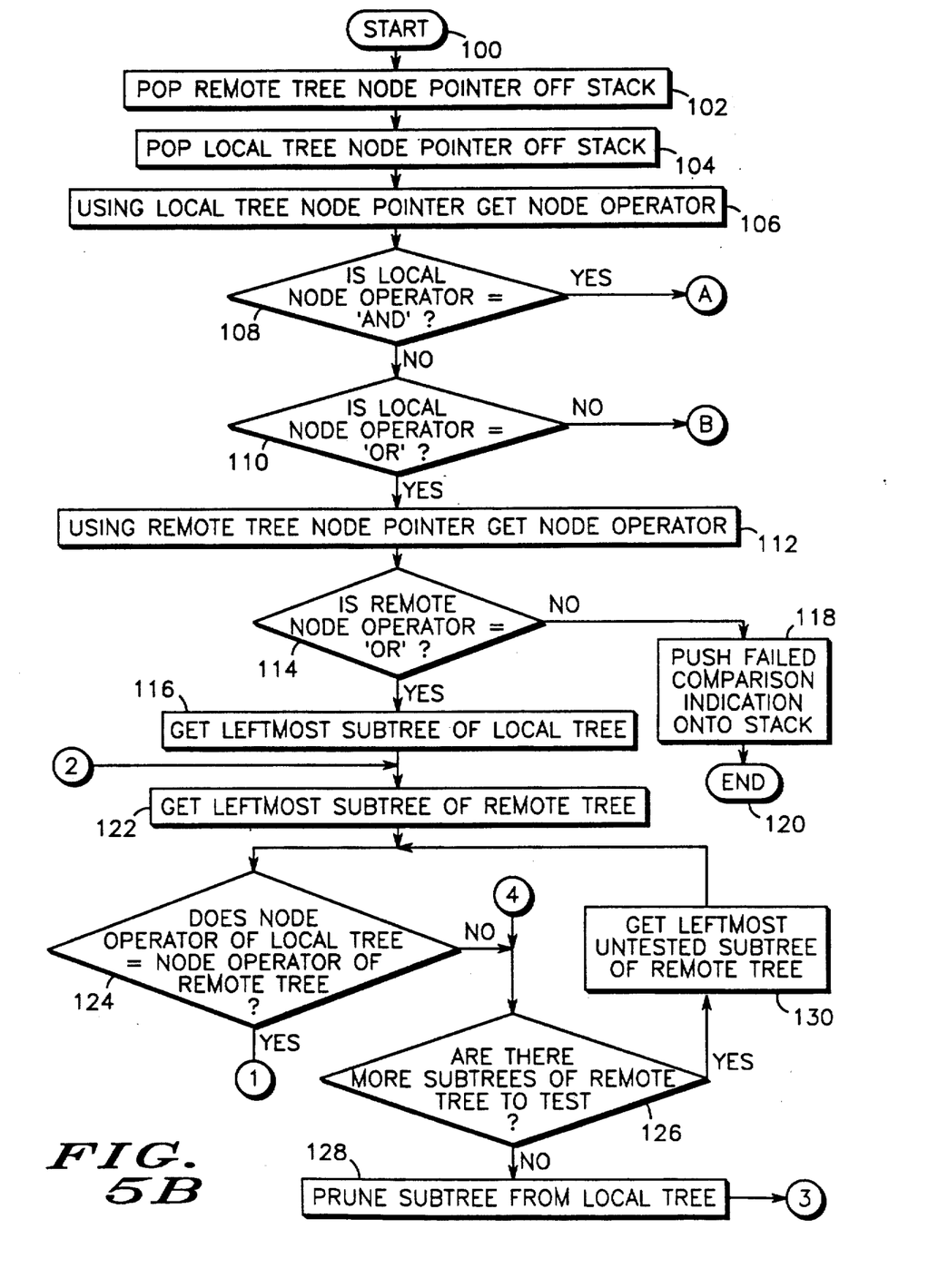
Figure 5C:
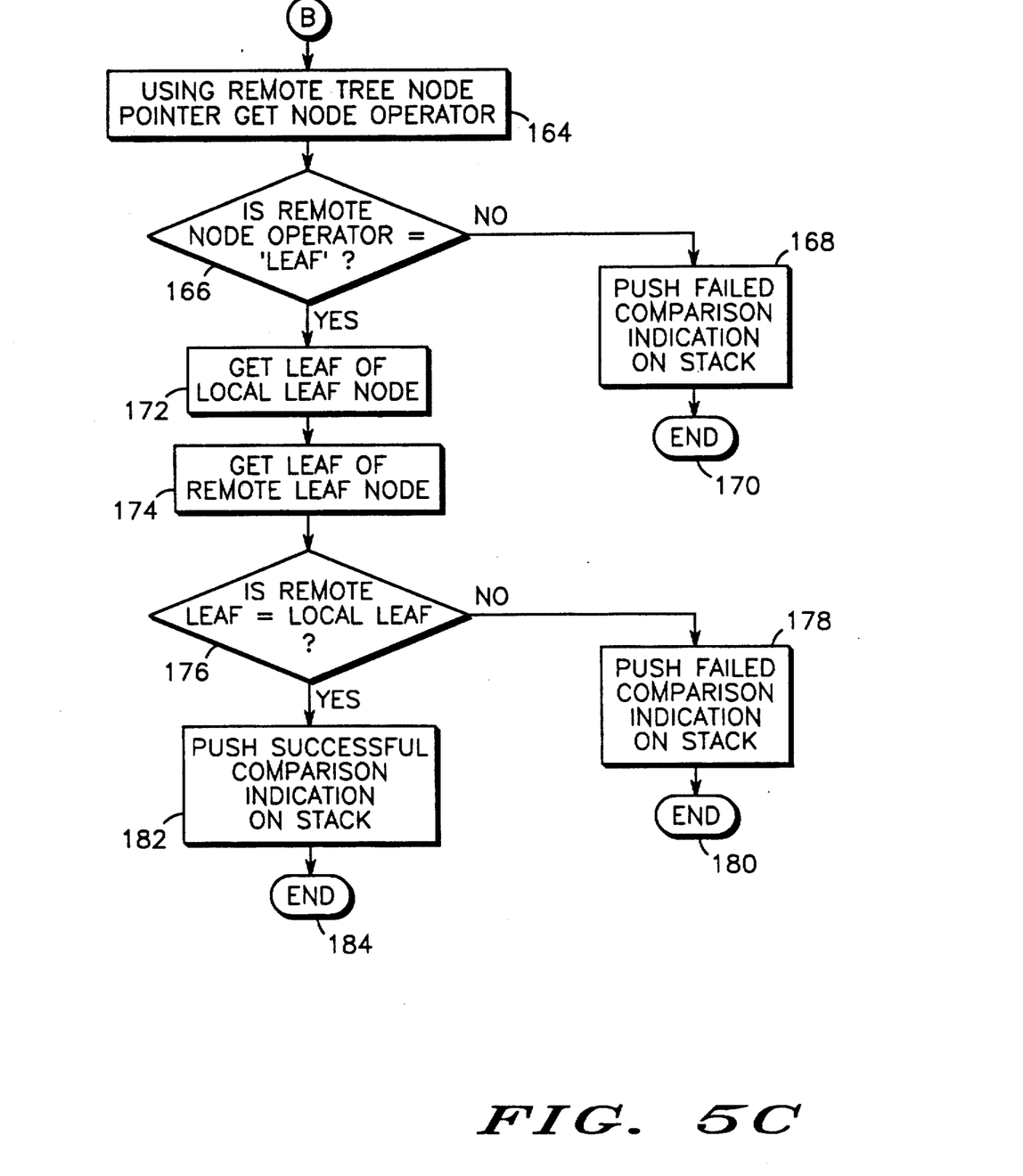
Figure 5D:
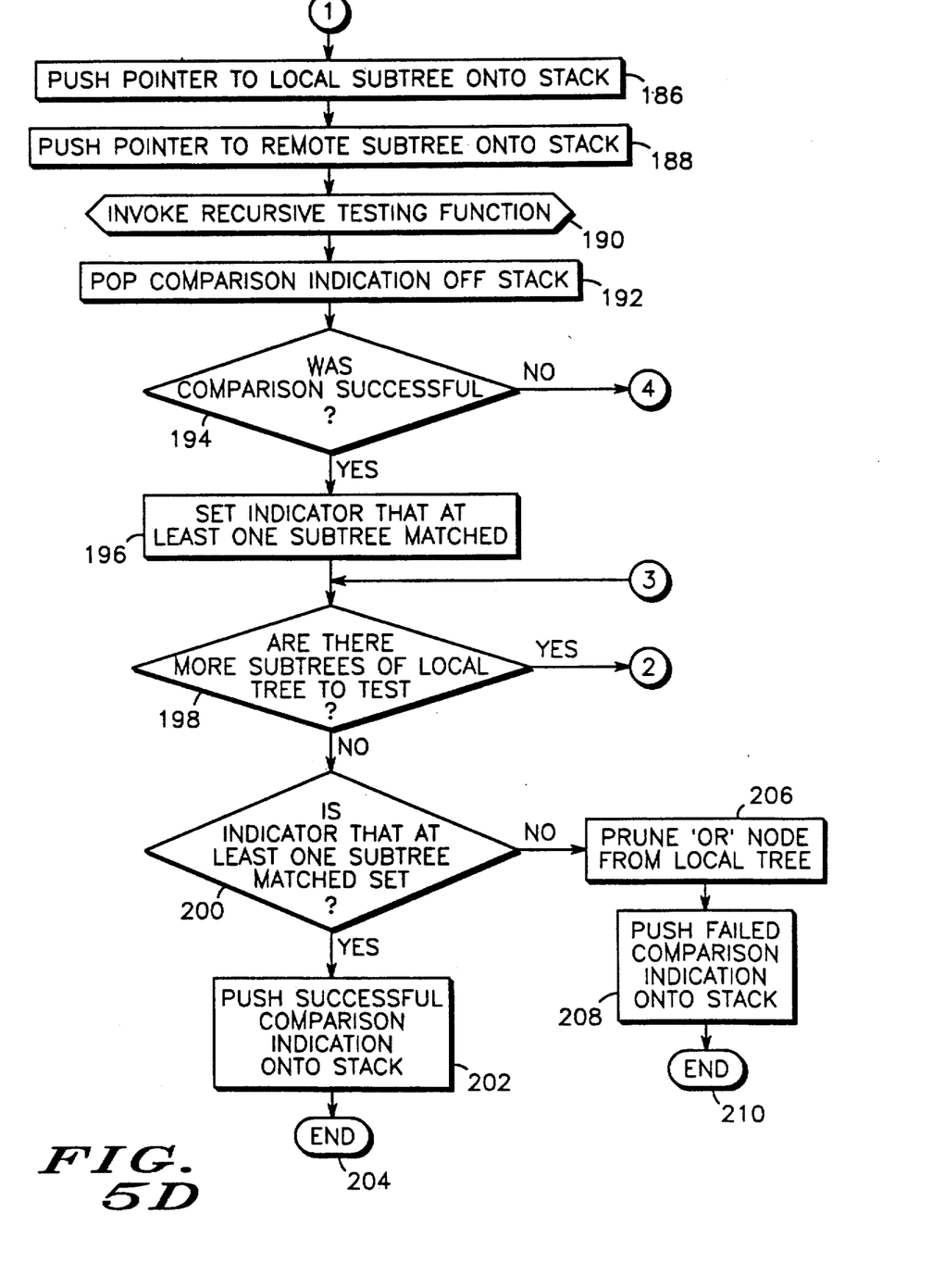

The intersect local and remote entity attribute trees process which was invoked by block 18 of FIG. 3 is initiated at block 30 of FIG. 4. The execution of the intersect local and remote entity attribute trees of FIG. 4 and the recursive testing function process of FIGS. 5A through 5D assumes the utilization of a stack. Stack mechanisms are well-known in the art to orderly store and remove items via corresponding PUSH and POP instructions. The PUSH instruction stores an item onto the top of the stack. The POP instruction removes the top item from the stack. The stack may be implemented in either hardware or software.

First, the intersect process pushes a pointer to the local attribute tree onto the stack, block 31. Next, block 32 pushes a pointer to the remote attribute tree onto the stack. Block 33 executes the recursive testing function logic. This logic shown in FIGS. 5A through 5D actually compares the attribute trees of two entities. Control is transferred to the recursive testing function.

When control is returned from the recursive testing function, block 34 is entered. Block 34 pops the comparison indication from the stack. Next, block 35 determines whether the comparison indication showed a successful indication. A successful indication is one in which a node operator and at least one attribute compare or intersect. If the comparison was successful, the YES path is followed from block 35 and control is transferred to block 37 whereby the process is ended. If the comparison was unsuccessful, the NO path is followed from block 35 to block 36. Block 36 prunes the root node from the local tree. By pruning the root node or highest level node, this indicates that there are no commonalties between the local tree and the remote tree submitted for comparison. In other words, the remote and local trees have no common attributes and therefore, the corresponding entities may not exchange information. Next, block 36 transfers control to block 37 which ends the process.

Referring to FIGS. 5A, 5B, 5C and 5D, taken collectively, the recursive testing function is entered from block 33 of FIG. 4 at the start block 100. First, block 102 pops the pointer for the remote tree node from the stack. Block 104 pops the pointer to the local tree node off of the stack. Next, using the pointer to the local tree, the node operator is obtained, block 106.

Block 108 determines whether the node operator is an "AND" function. If the node operator an "AND" function, control is transferred via the YES path to block 132. If the node operator was not an "AND" operation, control is transferred from block 108 via the NO path to block 110.

Block 110 determines whether the node operator is an "OR" function. If the node operator was not an "OR" function, block 110 transfers control via the NO path to block 164. If the node operator is an "OR" function, block 110 transfers control via the YES path to block 112. Block 112 obtains the root node operator of the remote tree. Next, it is determined whether the remote tree's node operator is an "OR" function. If the node operator of the remote tree is an "OR" function and the node operator of the local tree is not an "OR" function, block 114 transfers control to block 118 via the NO path. Block 118 pushes a failed comparison indicator onto the stack. The recursive testing function process then is ended and returns to the logic from which it was called, block 120.

If the remote node operator and the local node operator are both an "OR" function, then block 114 transfers control to block 116 via the YES path. Block 116 obtains the leftmost subtree of the local tree. The leftmost subtree is selected by way of convention. The rightmost part of the subtree could be used equally as well as a starting point. Next, block 122 obtains the leftmost of the subtree of the remote tree. Block 124 determines whether the node operator of the local subtree is equal to the node operator of the remote subtree. If the two node operators are unequal, block 124 transfers control to block 126 via the NO path. If these nodes are equal, block 124 transfers control to block 186 via the YES path.

Block 126 determines whether there are more subtrees of the remote tree to be examined. If there are no more subtrees to be examined, block 126 transfers control to block 128 via the NO path. Block 128 prunes the subtree from the local tree. The pruning operation consists of removing that portion of the subtree which does not have a matching node operator and all portions below it in the hierarchical tree structure. Block 12 then transfers control to block 198. If there are more subtrees to be tested, block 126 transfers control to block 130 via the YES path. Block 130 obtains the leftmost subtree of the remote tree which remains to be tested. Block 130 transfers control to block 124 to iterate the previous steps.

Block 186 pushes the pointer to the local subtree onto the stack. Next, block 188 pushes the pointer to the remote subtree onto the stack. Then, the recursive testing function which is presently in execution is invoked, block 190. This means that the recursive testing function is begun again at block 100. Since the stack now contains pointers to the local and remote subtrees, the recursive testing function will repeat its testing using the newly selected subtrees as its starting point before proceeding with the main tree testing.

After the recursive testing function has operated to conclusion on the local and remote subtrees, block 192 is entered. Block 192 pops or removes the comparison indicator from the stack. Next, 194 determines whether the subtree comparison was successful (whether there is at least one subtree commonly shared). If the comparison is unsuccessful, block 194 transfers control to block 126 via the NO path and the process is iterated starting with block 126 is iterated. If the comparison was successful, block 194 transfers control to block 196 via the YES path. Block 196 sets the comparison indicator to indicate that at least one subtree of the local and remote trees matched.

Next, block 198 determines whether there are more subtrees within the local tree to be tested. If there are more subtrees to be tested, block 198 transfers control to block 122 via the YES path after obtaining the next local untested tree and the process is iterated. If there are no more subtrees to be tested, block 198 transfers control to block 200 via the NO path. Block 200 determines whether the indicator is set to indicate that at least one subtree of the local and remote trees have matched. If a match indication is set to a first value, block 200 transfers control to block 202 via the YES path. Block 202 pushes a successful comparison indication onto the stack. Lastly, block 204 returns to the location calling the recursive testing function and ends the process. If the indicator is set to a second value to show that no subtrees have matched, block 200 transfers control to block 206. Block 206 prunes the "OR" node from the local tree. Next, a failed comparison indicator is pushed onto the stack, block 208. Lastly, block 210 returns to the place calling the recursive testing function and the process is ended.

If the node operator of the local tree is an "AND" function, block 132 obtains the node operator for the remote tree. Block 134 determines whether the node operator of the remote tree is an "AND" function. If the tree's remote node operator is not an "AND" function, block 134 transfers control via the NO path to block 136. Block 136 pushes a failed comparison indicator onto the stack. Lastly, block 138 returns to the place that has called the recursive testing function and the process is ended.

If the remote tree's node operator is an "AND" function, block 134 transfers control via the YES path to block 140. Block 140 obtains the leftmost untested subtree of the local tree. Block 142 obtains the leftmost untested subtree of the remote tree. Again, as mentioned above, the rightmost portion of the trees could be used equally as well. The leftmost portion was selected to facilitate the reading of the tree structure by persons reading the English language.

Block 144 pushes a pointer to the local subtree onto the stack. Block 146 pushes a pointer to the remote subtree onto the stack. Next, the recursive testing function is invoked from within itself, block 148. The pointers to the remote and local trees remain on the stack. The pointers to the untested local and remote subtrees are placed on top of the pointers to the local and remote subtrees on the stack. In this manner, the recursive testing function may iteratively call itself to analyze trees of the tree.

When the recursive testing function returns, block 150 is entered. Block 150 pops the comparison indication from the top of the stack. Block 152 determines whether the comparison of the subtrees was successful. If the comparison was unsuccessful, block 152 transfers control to block 154 via the NO path. Block 154 pushes a failed comparison indicator onto the stack. Lastly, block 156 returns to the location calling the recursive testing function and the process is ended. If the comparison was successful, block 152 transfers control to block 158 via the YES path.

Block 158 determines whether there are more local and remote subtrees to be tested. If there are more subtrees to be tested, block 158 transfers control via the YES path to block 140 and the above process is iterated. If there are not more subtrees to test, block 158 transfers control to block 160 via the NO path. Block 160 pushes a successful comparison indication onto the stack. Lastly, block 162 returns to the logic calling the recursive testing function and the process is ended.

If the node operator of the local tree was not an "OR" or an "AND" function, block 110 transfers control to block 164 via the NO path. Block 164 obtains the current node operator of the remote tree. Block 166 determines whether this node operator is a leaf. That is, it determines whether the node operator has only attributes below it in the hierarchical tree structure and no further node operators. See FIG. 1. If the node operator was not a leaf, block 166 transfers control to block 168 via the NO path. Block 168 pushes a failed comparison indication onto the stack. Lastly, block 170 returns to the logic calling the recursive testing function and the process is ended.

If the node operator of the remote tree is a leaf, block 166 transfers control to block 172 via the YES path. Block 172 obtains the leaf of the local tree. Block 174 obtains the leaf of the remote tree. These leaves are the actual attributes themselves. Block 176 determines whether the two leaves or attributes are equal. If they are unequal, block 176 transfers control to block 178 via the NO path. Block 178 pushes a failed comparison indication onto the stack since the two attributes are not equal. Lastly, block 180 returns to the logic calling the recursive testing function and the process is ended.

If the leaf or attribute comparison is successful, indicating a match or equality, block 176 transfers control to block 182 via the YES path. Block 182 pushes a successful comparison indication onto to the stack. Lastly, block 184 returns to the logic calling the recursive testing function and the process is ended.

It is to be noted that other node operators in addition to "AND" and "OR" may be defined. The processing for these additional node operators would be similar to that shown for "AND" and "OR". That is, the node operator must be detected in one tree, detected in the other tree and compared to determine a match.

When the recursive testing function returns to the logic calling it, after all iterations through the recursive testing function have been made, block 34 of FIG. 4 is entered. Block 34 pops the comparison indication off the stack. The comparison indication determines whether there was any matching attributes within the local and remote trees. If the comparison was successful, that is, there were some matching attributes, block 35 transfers control to block 37 via the YES path. Block 37 returns to the logic calling the intersect logic. If the comparison was unsuccessful, block 35 transfers control to block 36 via the NO path. Block 36 prunes the root node of the local tree indicating that there was no intersection or matching of any attributes between the local and remote trees. Lastly, block 37 returns to the calling logic.

When the intersect logic of FIG. 4 returns to the calling logic, control is transferred to block 19 of FIG. 3. Block 19 of FIG. 3 determines whether the local tree needs to be compared with any other remote trees. If further testing is required, block 19 iterates the intersect logic of FIG. 4 by transferring control via the NO path to block 17. When all other remote trees have been compared, FIG. 3 ends the process, block 20.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for attribute definition and distribution by a processor of a plurality of communication system entities, said method for attribute definition and distribution comprising the steps of:

defining at least one attribute in a grammar for said system;

first converting said attributes of said system into a hierarchical tree structure;

selecting a subset of said attributes of said system to represent a particular entity;

second converting said subset of attributes representing said particular entity to a corresponding subset of configuration information; and transmitting said configuration information of a first entity to a second entity, said configuration information corresponding to an attribute tree;

receiving by said first entity of said system configuration information corresponding to an attribute tree of said second entity;

third converting said configuration information of said first and second entities to corresponding first and second attributes trees; and comparing said first and said second attribute trees to determine whether common attributes exist between said first and said second attribute trees.

2. A method for attribute definition and distribution as claimed in claim 1, wherein there is further included the step of iterating said steps of selecting, second converting and transmitting for each of said plurality of entities of said system.

3. A method for attribute definition and distribution as claimed in claim 1, wherein there is further included the step of storing at said entity said particular subset of said configuration information corresponding to each entity.

4. A method for attribute comparison as claimed in claim 1, wherein there is further included the step of iterating said steps of transmitting and receiving for each of a plurality of entities of said system.

5. A method for attribute comparison as claimed in claim 1, wherein there is further included the step of indicating a status of said comparison of said first and second attribute trees.

6. A method for attribute comparison as claimed in claim 1, wherein there is further included the step of iterating said steps of third converting and comparing attribute trees for each of a plurality of entities of said system.

7. A method for recursive comparison of attribute trees by processor of a plurality communication system entities, including at least first and second attribute trees, said method for recursive comparison comprising the steps of:
   first determining whether a particular node operator of said first attribute tree matches a particular node operator of said second attribute tree;
   first indicating a miscomparison status for a miscomparison of said particular node operations of said first and second attribute trees;
   first obtaining a predefined subtree of said first and second attribute trees;
   first iterating said method for recursive comparison of attribute trees using said subtrees;
   second indicating a status of said method for recursive comparison of said predefined subtrees of said first and second attribute trees, said status being a first value for a comparison of said subtrees and said status being a second value for a miscomparison of said subtrees;
   second determining whether an attribute of said first attribute tree corresponds to an attribute of said second attribute tree, said step of said second determining being performed in response to said step of said first indicating resulting in said miscomparison status or in a miscomparison status of said particular node operators with one of a plurality of predefined node operators; and
   third indicating a status of said step of said second determining, said step of third indicating providing said status of a first value for a miscomparison of said step of second determining and said step of third indicating providing said status of a second value for a comparison of said step of second determining, said step of third indicating being performed in response to said step of second determining.

8. A method for recursive comparison of attribute trees as claimed in claim 7, wherein there is further included the steps of:
   second obtaining a predefined node operator of said first attribute tree; and
   third determining whether said predefined node operator of said first tree is one of said plurality of said predefined node operators.

9. A method for recursive comparison of attribute trees as claimed in claim 8, said step of third determining including the steps of:
   first testing said predefined node operators of said first and second attribute trees for being an AND function; and
   second testing said predefined node operators of said first and second attribute trees for being an OR function.

10. A method for recursive comparison of attribute trees as claimed in claim 9, said step of first obtaining including the steps of:
   fourth determining an untested subtree of said first attribute tree, said step of fourth determining being performed in response to said step of third determining; and
   fifth determining an untested subtree of said second attribute tree, said step of fifth determining being performed in response to said step of third determining.

11. A method for recursive comparison of attribute trees as claimed in claim 10, said step of second indicating including the steps of:
   third obtaining said status of said method for recursive comparison for said subtrees;
   third testing said status for comparison and miscomparison indications; and
   fourth indicating a first value of said status for a miscomparison indication and a second value of said status for a comparison indication.

12. A method for recursive comparison of attribute trees as claimed in claim 11, wherein there is further included the steps of:
   sixth determining whether untested subtrees of said first and second attribute trees exist; and
   second iterating said steps of first obtaining and first iterating for each of said plurality of untested subtrees.

13. A method for recursive comparison of attribute trees as claimed in claim 12, said step of second indicating including the steps of:
   fourth testing said status of said method for recursive comparison indicating that at least one subtree of said first and second attribute trees match;
   providing said status of said second value for matching subtrees of said first and second attribute trees;
   removing a predetermined node operator from said first attribute tree, said step of removing being performed in response to said step of fourth testing indicating that no subtrees of said first and second attribute trees match; and
   fifth indicating said status of said first value for a miscomparison of said first and second attribute trees.

14. A method for recursive comparison of attribute trees as claimed in claim 13, said step of second determining further including the steps of:
   fifth testing a node operator for determining whether other lower level node operators are connected to said node operator; and
   sixth indicating said status of said first value for said step of fifth testing indicating that said node operator is connected to other lower level node operators.

15. A method for recursive comparison of attribute trees as claimed in claim 14, wherein there is further included the steps of:
   fourth obtaining said node operator having lower level node operators of said first attribute tree, said step of fourth obtaining being performed in response to said step of said fifth testing indicating said node operator not being connected to other lower level node operators; and
   fifth obtaining a corresponding node operator of said second attribute tree, said step of fifth obtaining being performed in response to said step of fifth testing indicating said node operator node being connected to other lower level node operators.

16. A method for recursive comparison of attribute trees as claimed in claim 15, said step of third indicating including the steps of:
   sixth obtaining an attribute of said node operator without lower level node operators of said first attribute tree, said step of sixth obtaining being performed in response to said step of fourth obtaining;
   seventh obtaining an attribute of said node operator without lower level node operators of said second attribute tree, said step of seventh obtaining being performed in response to said step of said fifth obtaining; and sixth testing said attributes of said first and second attribute trees for equality.

17. A method for recursive comparison of attribute trees as claimed in claim 16, said step of third indicating further including the steps of:

seventh indicating said status of said second value for a comparison of said attributes of said first and second attribute trees, step of seventh indicating being performed in response to said step of sixth testing; and eighth indicating said status of said first value for a miscomparison of said attributes of said first and second attribute trees, said step of eighth indicating being performed in response to said step of sixth testing.

18. A method for recursive comparison of attribute trees as claimed in claim 8, said step of first determining further including the steps of:

eighth obtaining said first attribute tree; and ninth obtaining said second attribute tree.

19. A method for recursive comparison of attribute trees as claimed in claim 7, wherein there is further included the step of repeating said steps of claim 8 consecutively for determining common attributes for a plurality of attribute trees of corresponding entities.

* * * * *

UNITED STATES PATENT AND TRADEMARK OFFICE
CERTIFICATE OF CORRECTION

PATENT NO. : 5,021,943
DATED : June 4, 1991
INVENTOR(S) : Thomas Grimes

It is certified that error appears in the above-identified patent and that said Letters Patent is hereby corrected as shown below:

Title page:
    In the title, delete "COTENT" and substitute --CONTENT--.
    In column 12, claim 18, line 2, delete "8" and substitute --7--.
    In column 12, claim 19, line 3, delete "8" and substitute --7--.

Signed and Sealed this

First Day of September, 1992

Attest:

DOUGLAS B. COMER

Attesting Officer    Acting Commissioner of Patents and Trademarks